(12) United States Patent
Lee (10) Patent No.: US 10,958,677 B2
(45) Date of Patent: Mar. 23, 2021

(54) RISK IDENTIFICATION FOR UNLABELED THREATS IN NETWORK TRAFFIC

(71) Applicant: AT&T Intellectual Property I, L.P., Atlanta, GA (US)

(72) Inventor: Melissa Lee, McKinney, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 167 days.

(21) Appl. No.: 16/224,406

(22) Filed: Dec. 18, 2018

(65) Prior Publication Data

US 2020/0195673 A1 Jun. 18, 2020

(51) Int. Cl.
*H04L 29/06* (2006.01)
*H04L 12/721* (2013.01)

(52) U.S. Cl.
CPC .......... *H04L 63/1425* (2013.01); *H04L 45/70* (2013.01); *H04L 63/1441* (2013.01)

(58) Field of Classification Search
CPC combination set(s) only.
See application file for complete search history.

(56) References Cited

U.S. PATENT DOCUMENTS

| 8,085,681 | B2* | 12/2011 | Raftelis .............. H04L 63/1441 370/252 |
| 8,495,747 | B1 | 7/2013 | Nakawatase et al. |
| 8,572,740 | B2 | 10/2013 | Mashevsky et al. |
| 8,819,285 | B1* | 8/2014 | Wilkinson .......... H04L 61/6009 709/246 |
| 9,094,288 | B1 | 7/2015 | Nucci et al. |
| 9,141,791 | B2 | 9/2015 | Shiva et al. |
| 9,349,103 | B2 | 5/2016 | Eberhardt et al. |
| 9,516,053 | B1* | 12/2016 | Muddu ................. G06F 16/254 |
| 9,544,321 | B2 | 1/2017 | Baikalov et al. |
| 9,781,160 | B1 | 10/2017 | Irimie et al. |

(Continued)

FOREIGN PATENT DOCUMENTS

| WO | 2015168611 A1 | 11/2015 |
| WO | 2018027226 A1 | 2/2018 |
| WO | 2018081016 A1 | 5/2018 |

OTHER PUBLICATIONS

Gruhl et al., "A Concept for Intelligent Collaborative Network Intrusion Detection", ISBN 978-3-8007-4395-7, ARCS 2017, Apr. 3-6, 2017, Wien, Austria, (Year: 2017).*

(Continued)

*Primary Examiner* — Piotr Poltorak (57) ABSTRACT

A processing system including at least one processor may obtain network traffic data of a network, including a first set of flow data associated with a first node, determine an anomaly factor of the first node from the network traffic data quantifying a deviation of the first set of flow data from a normal flow data associated with the first node, generate an exposure score of the first node in accordance with a measured influence of the first node in the network and the anomaly factor, generate a persistence score of the first node in accordance with a reputation measure of the first node and a measure of a recurrence of anomalous flow data associated with the first node, calculate a threat level of the first node from the exposure score and the persistence score, and reconfigure at least one aspect of the network in response to the threat level.

20 Claims, 4 Drawing Sheets

(56) References Cited

U.S. PATENT DOCUMENTS

| | | | |
|---|---|---|---|
| 9,800,605 B2 | 10/2017 | Baikalov et al. | |
| 9,923,917 B2 | 3/2018 | Fausto et al. | |
| 9,948,663 B1 | 4/2018 | Wang et al. | |
| 9,954,883 B2 | 4/2018 | Ahuja et al. | |
| 10,021,133 B1 | 7/2018 | Lakshmanan et al. | |
| 10,135,848 B2 | 11/2018 | Muddu et al. | |
| 2011/0047620 A1* | 2/2011 | Mahaffey | H04L 63/1441 726/23 |
| 2012/0159632 A1* | 6/2012 | Barriga | H04W 4/24 726/24 |
| 2013/0298230 A1* | 11/2013 | Kumar | H04L 63/1425 726/22 |
| 2015/0207809 A1* | 7/2015 | MacAulay | G06F 21/552 726/22 |
| 2016/0117505 A1* | 4/2016 | Chow | G06F 21/552 726/22 |
| 2016/0142427 A1* | 5/2016 | de los Reyes | H04L 63/1441 726/23 |
| 2016/0173446 A1* | 6/2016 | Nantel | H04L 63/0209 726/11 |
| 2016/0182538 A1* | 6/2016 | Teddy | H04L 63/1416 726/23 |
| 2016/0269430 A1* | 9/2016 | Laswell | H04L 63/1416 |
| 2017/0237755 A1 | 1/2017 | Visbal | |
| 2017/0118240 A1* | 4/2017 | Devi Reddy | G06N 5/02 |
| 2017/0279843 A1 | 6/2017 | Schultz et al. | |
| 2017/0223034 A1 | 8/2017 | Singh et al. | |
| 2017/0310703 A1 | 10/2017 | Ackerman et al. | |
| 2018/0191768 A1 | 7/2018 | Broda et al. | |
| 2018/0205755 A1* | 7/2018 | Kavi | G06F 16/951 |
| 2018/0278650 A1 | 9/2018 | Ray et al. | |
| 2018/0316727 A1* | 11/2018 | Tsironis | H04L 63/20 |
| 2018/0332064 A1* | 11/2018 | Harris | H04L 43/026 |
| 2018/0337943 A1* | 11/2018 | Arnell | H04L 41/08 |
| 2018/0375861 A1* | 12/2018 | Isola | H04L 63/102 |
| 2019/0260770 A1* | 8/2019 | Sansom | G06K 9/6218 |
| 2019/0312887 A1* | 10/2019 | Grimm | H04L 63/0236 |
| 2020/0007586 A1* | 1/2020 | Seeber | H04L 63/20 |

OTHER PUBLICATIONS

Hu et al., "Asset Risk Scoring in Enterprise Network with Mutually Reinforced Reputation Propagation", DOI 10.1109/SPW.2014.18 (Year: 2014).*

Jin et al., "Intranet User-Level Security Traffic Management with Deep Reinforcement Learning", 978-1-7281-2009-6, International Joint Conference on Neural Networks. Budapest, Hungary. Jul. 14-19, 2019, (Year: 2019).*

Kim et al., "A Flow-based Method for Abnormal Network Traffic Detection", DOI: 10.1109/NOMS.2004.1317747 , Managing Next Generation Convergence Networks and Services, IEEE/IFIP Network Operations and Management Symposium Conference, NOMS 2004, Seoul, Korea, Apr. 19-23, 2004 (Year: 2004).*

Zaffar et al., "Cooperative Forensics Sharing", IEEE 1-4244-0463-0/06 (Year: 2006).*

Ezefosie, Nkirue. "A Data Driven Anomaly based behavior detection method for Advanced Persistent Threats (APT)." Diss. 2016. https://repository.aust.edu.ng/xmlui/bitstream/handle/123456789/621/EZEFOSIE%20Nkirue.pdf?sequence=1&isAllowed=y.

Singh, Umesh Kumar, and Chanchala Joshi. "Scalable Approach Towards Discovery of Unknown Vulnerabilities." International Journal of Network Security, vol. 20, No. 5, pp. 827-835, Sep. 2018. http://ijns.femto.com.tw/contents/ijns-v20-n5/ijns-2018-v20-n5-p827-835.pdf.

Garcia-Teodoro, Pedro, et al. "Anomaly-based network intrusion detection: Techniques, systems and challenges." computers & security 28.1-2 (2009): 18-28. http://dtstc.ugr.es/~jedv/descargas/2009_CoSe09-Anomaly-based-network-intrusion-detection-Techniques,-systems-and-challenges.pdf.

Mateski, Mark, et al. "Cyber threat metrics." Sandia National Laboratories (2012). https://nsarchive2.gwu.edu/NSAEBB/NSAEBB424/docs/Cyber-065.pdf.

* cited by examiner

RISK IDENTIFICATION FOR UNLABELED THREATS IN NETWORK TRAFFIC

The present disclosure relates generally to telecommunication network operations, and more particularly to devices, computer-readable media, and methods for reconfiguring at least one aspect of a network in response to a threat level of a node calculated from an exposure score and a persistence score.

BACKGROUND

Anomaly detection algorithms are increasingly used in the realm of cybersecurity and threat detection. However, most solutions produce large amounts of output which may still need to be manually scanned, or rely on having labels for threats and assessing predicted impacts based on a label.

SUMMARY

In one example, the present disclosure discloses a device, computer-readable medium, and method for reconfiguring at least one aspect of a network in response to a threat level of a node calculated from an exposure score and a persistence score. For example, a method may include a processing system including at least one processor obtaining network traffic data of a network, where the network traffic data includes at least a first set of flow data associated with at least a first node and determining an anomaly factor of the first node from the network traffic data, where the anomaly factor quantifies a deviation of the at least the first set of flow data associated with the first node from a normal flow data associated with the first node. The processing system may further generate an exposure score of the first node in accordance with a measured influence of the first node in the network and the anomaly factor, generate a persistence score of the first node in accordance with a reputation measure of the first node and a measure of a recurrence of anomalous flow data associated with the first node, and calculate a threat level of the first node from the exposure score and the persistence score. The processing system may then reconfigure at least one aspect of the network in response to the threat level.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media and methods for reconfiguring at least one aspect of a network in response to a threat level of a node calculated from an exposure score and a persistence score. In particular, examples of the present disclosure assign a risk score to unlabeled threats using measures of exposure and persistence. For example, an exposure measure takes into account the influence that a node has in the network, anomalous activity of the node detected via one or more machine learning algorithms (MLAs), and the success and volume of data that is transmitted via a flow. This metric defines the potential exposure of the rest of the network to any malicious activity that may be occurring on a particular node. The persistence measure takes into account the reputation of a node and the extent of repetition of anomalous communications.

Notably, the accuracy and effectiveness of existing solutions relying on labels threats depends upon the skill of the security analyst. In other words, these schemes can be highly subjective and limited to labeled threats. Anomaly detection algorithms may identify unlabeled anomalies, but may produce more anomalies than can be investigated by security professionals. In contrast, in accordance with the present disclosure, the calculation of a risk score, or "threat level" is not affected by the experience/quality of a security analyst. Since this threat level is calculated from the data, it is more likely to be stable and carry a consistent weight. Secondly, this threat level enables the prioritization of suspicious activity detected by anomaly detection algorithms without the need to first identify the nature of the threat. This feature allows security analysts to make the most of their efforts to track down the most serious threats. These and other aspects of the present disclosure are discussed in greater detail below in connection with the examples of FIGS. 1-4.

Figure 1:
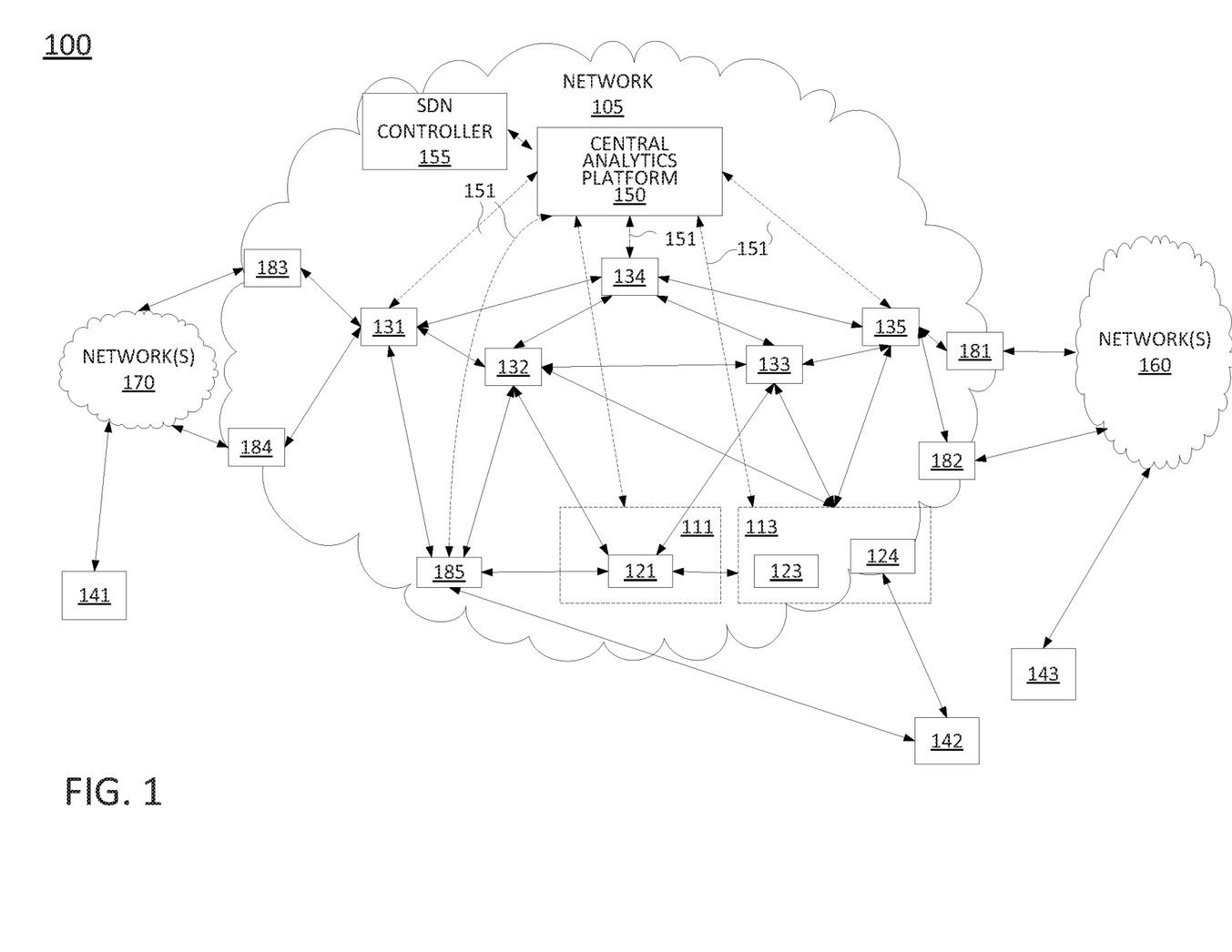
FIG. 1 illustrates an example system related to the present disclosure.

To aid in understanding the present disclosure, FIG. 1 illustrates a block diagram depicting one example of a communications network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) comprising virtual network functions (VNFs). In other words, at least a portion of the network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may comprise wireless networks (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. User devices 141-143 may comprise, for example, cellular telephones, smart phones, personal computers, other wireless and wired computing devices, private branch exchanges, customer edge (CE) routers, media terminal adapters, cable boxes, home gateways and/or routers, and so forth.

In accordance with the present disclosure, user devices 141-143 may access network 105 in various ways. For example, user device 141 may comprise a cellular telephone which may connect to network 105 via network 170, e.g., a cellular access network. For instance, such an example network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a domain name service (DNS) server, a packet data network gateway (PGW), a gateway mobile switching center (GMSC), a short message service center (SMSC), etc.

Figure 4:
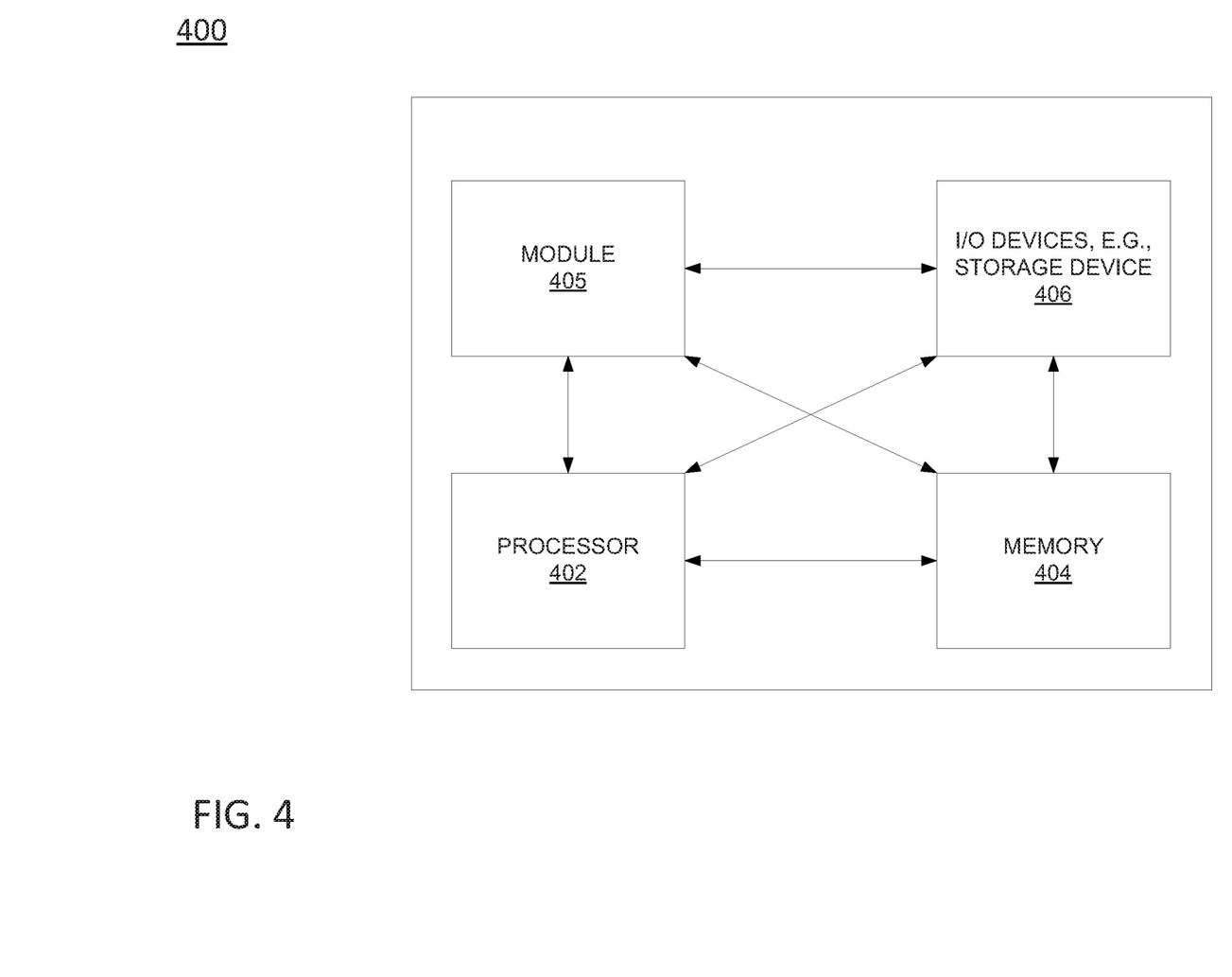
FIG. 4 illustrates an example high-level block diagram of a computing device specifically programmed to perform the steps, functions, blocks, and/or operations described herein.

As further illustrated in FIG. 1, network 105 includes a software defined network (SDN) controller 155. In one example, the SDN controller 155 may comprise a computing system or server, such as computing system 400 depicted in FIG. 4, and may be configured to provide one or more operations or functions in connection with examples of the present disclosure for reconfiguring at least one aspect of a network in response to a threat level of a node calculated from an exposure score and a persistence score. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 4 and discussed below) or multiple computing devices collectively configured to perform various steps, functions, and/or operations in accordance with the present disclosure.

In one example, NFVI 111 and unit 121, and NFVI 113 and units 123 and 124 may be controlled and managed by the SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may comprise secure tunnels for signaling communications over an underling IP infrastructure of network 105. In other words, the control links may comprise virtual links multiplexed with transmission traffic and other data traversing network 105 and carried over a shared set of physical links. For ease of illustration the control links are omitted from FIG. 1. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

The functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SDN controller 155 via additional control links. However, at least a portion of the internal nodes 131-135 may comprise dedicated devices or components, e.g., non-SDN reconfigurable devices.

Similarly, network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 123 and component 185. As mentioned above, components 183 and 184 may comprise a serving gateway (SGW), a mobility management entity (MME), or the like. However, in another example, components 183 and 184 may also comprise PE routers interfacing with network(s) 170, e.g., for non-cellular network-based communications. In one example, components 181-185 may also comprise VNFs hosted by and operating on additional NFVI. However, in another example, at least a portion of the components 181-185 may comprise dedicated devices or components.

In one example, network 105 further includes a central analytics platform 150. The central analytics platform 150 may comprise a computing system or server, such as computing system 400 depicted in FIG. 4, and may be configured to provide one or more operations or functions in connection with examples of the present disclosure for reconfiguring at least one aspect of a network in response to a threat level of a node calculated from an exposure score and a persistence score. For instance, central analytics platform 150 may obtain network traffic data of network 105 (and/or networks 160, 170, etc.), where the network traffic data includes at least a first set of flow data associated with at least a first node (e.g., any of internal nodes 131-135, components 181-185, units 121, 123, and 124, NFVI 111 and 113, and so forth). The network traffic data may be obtained from various devices in the network 105. For instance, the devices may send usage data to central analytics platform 150, or any one or more of internal nodes 131-135, components 181-185, units 121, 123, and 124, NFVI 111 and 113, and so forth may comprise aggregation points for collecting network traffic data and forwarding the network traffic data to central analytics platform 150. In addition, the central analytics platform 150 may determine an anomaly factor of the first node from the network traffic data, where the anomaly factor quantifies a deviation of the at least the first set of flow data associated with the first node from a normal flow data associated with the first node. The central analytics platform 150 may further generate an exposure score of the first node in accordance with a measured influence of the first node in the network 105 (and/or in the system 100) and the anomaly factor, generate a persistence score of the first node in accordance with a reputation measure of the first node and a measure of a recurrence of anomalous flow data associated with the first node, and calculate a threat level of the first node from the exposure score and the persistence score.

The central analytics platform 150 may then reconfigure at least one aspect of the network 105 in response to the threat level. For instance, the central analytics platform 150 may block network traffic of the first node, throttle the network traffic of the first node, remove payloads of packets of the network traffic of the first node, and so forth. For instance, the central analytics platform may notify or instruct SDN controller 155 to configure or reconfigure one or more components of network 105 to reroute the traffic of the first node, to slow the traffic of the first node, and so forth. In this regard, central analytics platform 150 and/or SDN controller 155 may instantiate at least a second node to replace the first node for a network service and/or redirect traffic of the network service for the first node to the at least the second node. For instance, inbound or outbound traffic of the first node may be additionally filtered, e.g., by a firewall, a sandbox, a malware detection system, or the like which may pass the traffic if cleared as non-malicious, or dropped, quarantined, stripped of payload, and so forth, if not cleared and/or if specifically identified as a known threat. Similarly, the node may be decommissioned (if a VM, container or the like on NFVI 111 or 113) in response to the threat level. For instance, if the threat level is very high, or severe, the central analytics platform 150 may determine that the node should be effectively removed from the network 105, e.g., without waiting for further investigation. Additional functions that may be performed by central analytics platform 150 and/or SDN controller 155 are described in greater detail below in connection with the examples of FIGS. 2 and 3, and the following discussion.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. In still another example, SDN controller 155, central analytics platform 150, and/or other network elements may comprise functions that are spread across several devices that operate collectively as a SDN controller, a central analytics platform, an edge device, etc. Thus, these and other modifications of the system 100 are all contemplated within the scope of the present disclosure.

Notably, anomaly detection algorithms may define "normal" patterns in network traffic data (e.g., flow data) and detect deviations from those patterns. Although anomaly detection algorithms are effective for detecting suspicious behavior on networks, the algorithms often produce more anomalies than security analysts are able to investigate. As such, existing methods of risk assessment may primarily apply to known threats (signature-based approaches) and can be highly subjective, and possibly unreliable, based on the skill of the security analyst.

Examples of the present disclosure are particularly suitable for application to unlabeled threats, although the present examples may also be applied to threats which match available signatures. In accordance with the present disclosure a "threat" is a potentially compromised or malicious node (e.g., a device in the network or connected to the network and which in one example may be identified by an Internet Protocol address) involved in anomalous behavior. The classification resulting from risk assessment is calculated from two component metrics: exposure and persistence. Exposure is focused on assessing the influence level of a node, the statistical severity of the anomalous behavior, and the presence of content in packets relevant to suspicious activity. Persistence takes into account the known reputation of the node and the recurrence of the anomalous patterns through time. Bringing the exposure and persistence components together, the risk classification of the present disclosure quantifies the impact and seriousness of a threat with respect to network architecture and historical behavior.

In one example, the present disclosure collects network traffic data of a network, e.g., flood data containing information surrounding measured properties (e.g., bytes, packets, duration) and characteristic properties (e.g., source IP address, destination IP address, source port, destination port, etc.) of various flows of data. Depending on the risk component being calculated, both measured and characteristic properties of the flow data may be used. In addition, although illustrative examples of the present disclosure may apply to IPv4 transmission control protocol (TCP)-based traffic, the present disclosure is applicable to a broad range of traffic types and network types.

As stated above, one of the components of the risk classification of the present disclosure is "exposure," which in one example, defines the present and potential impact of a threat through three subcomponents, the first of which is an "influence" measure. For example, the influence measure may explain how connected a node is and how critical a node is to proper network function. It allows for the ability to quantify how easily any infection or malicious activity will either spread through the network or indirectly impact a large number of nodes by affecting the primary functions of the network.

Figure 2:
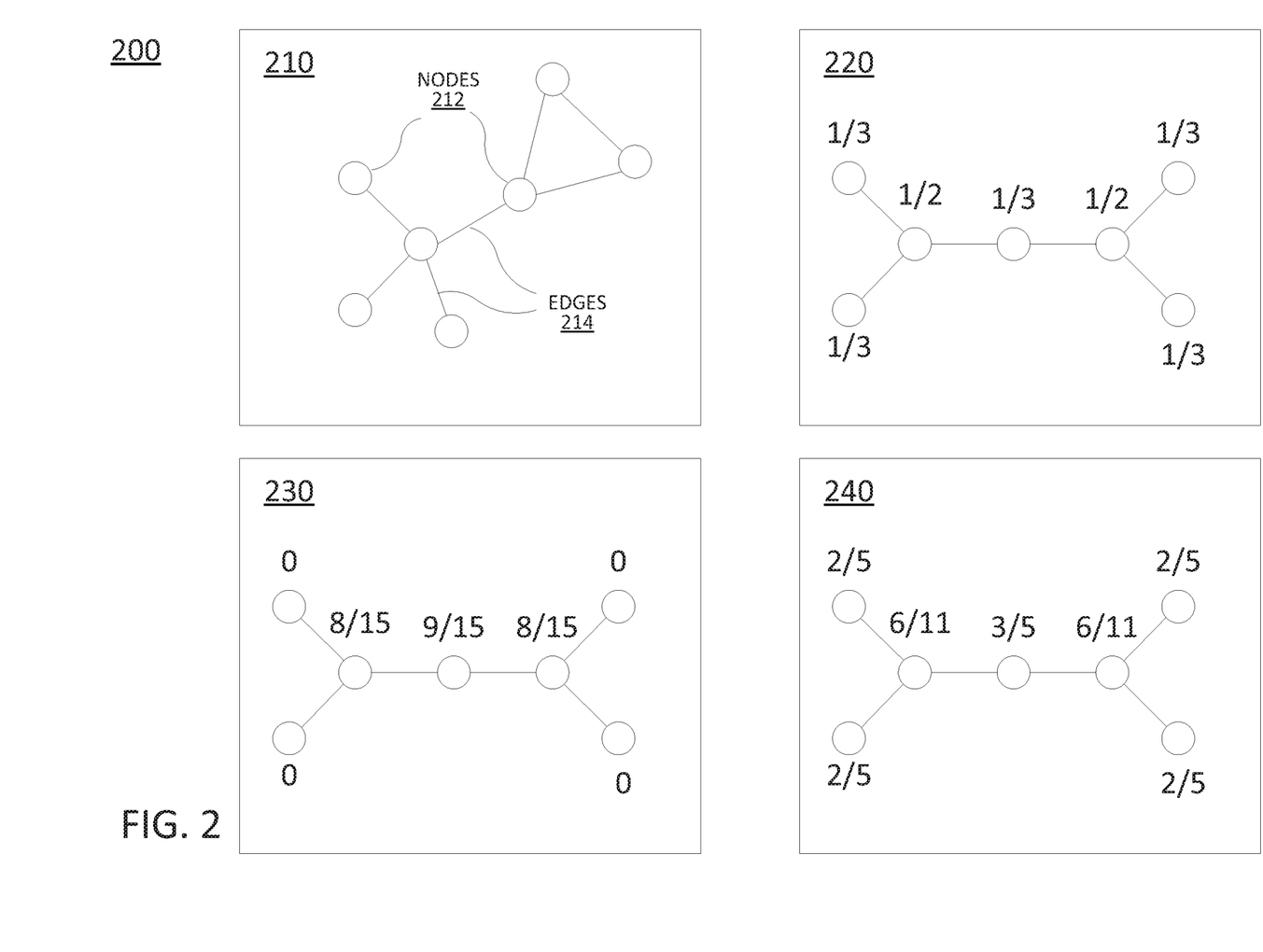
FIG. 2 illustrates a plurality of network graphs relating to calculations of centrality metrics, in accordance with the present disclosure.

In one example, communication within the network may be modeled using graph analysis. For instance, graphs may be composed of a number of distinct nodes and edges. In network traffic data, source and target IP addresses may define the nodes in a graph representation, and edges may contain a variety of information such as the bytes or number of packets that move between the nodes. To illustrate, FIG. 2 illustrates a first graph 210 having a plurality of nodes 212 interconnected by a plurality of edges 214. To use graph theory to quantify the influence of a node, the present disclosure may use one or several measures of centrality which may describe the connectedness of a node. For instance, in one example, the present disclosure determines an "influence" measure from: a degree centrality metric, a closeness centrality metric, and a betweenness centrality metric. These different centrality metrics are described in connection with the example graphs 220, 230, and 240 of FIG. 2.

The degree of a node is a measure of centrality that may be calculated by counting the number of edges that are attached to a node. In one example, the present disclosure utilizes a normalized degree measure, e.g., in accordance with Equation 1:

$$C_D(n_i) = \frac{D_i(n_i)}{N-1} \qquad \text{Equation 1}$$

In Equation 1, $D_i(n_i)$ is the number of connections for a node n and N−1 is the maximum possible number of connections. The normalized measure may be used to ensure that all values are comparable, even among separate graphs, with values between 0 and 1. A high normalized degree could indicate that a node is performing a function that is important to the network. In graph 220 of FIG. 2, the number beside each node indicates the normalized degree of the node. According to degree centrality, the most important nodes in the graph 220 of FIG. 2 are the two nodes with a normalized degree of ½, or ⅜. In the context of network traffic, these nodes are the nodes with the most connections to other nodes.

There are cases when degree centrality may not completely capture the importance of a node. For instance, degree centrality may not capture the ability of a node to broker communications between groups or send communications to far reaching parts of the network. To quantify a node's ability to broker communication, a betweenness centrality may be used. Betweenness identifies when many paths must pass through a node to reach other parts of a network. Notably, failure or infection of a node with high betweenness centrality could result in major disruption to the network. In one example, the present disclosure utilizes a normalized betweenness centrality measure, e.g., in accordance with Equation 2:

$$C_B(n_i) = \frac{\sum \frac{g_{jk}(n_i)}{g_{jk}}}{(N-1)(N-2)/2} \qquad \text{Equation 2}$$

In Equation 2, $$\sum \frac{g_{jk}(n_i)}{g_{jk}}$$

represents the fraction of shortest paths that travel through a node $n_i$, and (N−1)(N−2)/2 is the number of pairs of nodes (excluding the node itself) in the network. In the graph 230 depicted of FIG. 2, the node with the highest betweenness has a value of 9/15 and may be designated as an influential node of the network, e.g., when the concern is the ability of information to travel from one part of the network to another.

The present disclosure may also identify nodes that may not be influential in the sense that the nodes do not have many connections or broker information, yet the nodes may be connected to important nodes that do have those qualities. In this scenario, degree and betweenness centrality metrics may insufficiently capture this quality. In one example, the present disclosure utilizes a normalized closeness centrality measure, e.g., in accordance with Equation 3:

$$C_C(n_i) = \frac{(N-1)}{\sum d(n_i, n_j)} \qquad \text{Equation 3}$$

In Equation 3, (N−1) is the maximum possible number of connections for node $n_i$ and $\Sigma d(n_i,n_j)$ is the total distance to the other nodes. The node with the highest normalized closeness has the shortest average distance to other nodes. In the graph 240 depicted of FIG. 2, the node with the highest betweenness has a value of ⅗. From the graphs 220, 230, and 240 of FIG. 2, it can be seen that the centermost node is the most influential according to closeness and betweenness while the nodes to the left and right of the center are most influential according to degrees. Qualitatively, degree, closeness, and betweenness reveals that the center node does not have many connections, but it is tied to important nodes and is crucial for network flow. There are many other different scenarios that can occur, and the relationships between levels of centrality for additional scenarios are illustratively shown in Table 1:

TABLE 1

|  | Low degree | Low closeness | Low bewteenness |
|---|---|---|---|
| High degree |  | Node is embedded in cluster that is far from the rest of the network | Connections are redundant, communication bypasses the node |
| High closeness | Node is tied to important/active nodes |  | May be many paths in network. Nodes is near many other nodes but so are many others |
| High betweenness | Few ties that are crucial for network flow | Node monopolizes the ties from a smaller number of nodes to many other nodes |  |

In one example, the normalized measures of centrality undergo transformation before calculating a comprehensive influence score. For instance, in one example, the normalized values for degree, closeness, and betweenness centralities are discretized into 5 bins which are defined by quantiles for each respective metric. For example, quantiles may be used to divide the range of a probability distribution into separate intervals with equal probabilities. In the present disclosure, the values corresponding to the boundaries of each bin may be set using historical data on the network. For instance, a first bin may represent a "low" level of influence and may represent a quantile from $0.00 \leq x < 0.20$. A second bin may represent a "moderate" level of influence and may represent a quantile from $0.20 \leq x < 0.40$. A third bin may represent an "average" level of influence and may represent a quantile from $0.40 \leq x < 0.60$. A fourth bin may represent a "high" level of influence and may represent a quantile from $0.60 \leq x < 0.80$. Finally, a fifth bin may represent a "very high" level of influence and may represent a quantile from $0.80 \leq x < 1.00$. In one example, bins may be calculated for specific time intervals (e.g. daily, hourly, etc.) to adjust for seasonal changes to network structure.

Once data is assigned to a bin for each centrality metric, the metrics may be combined by taking the weighted sum of each centrality bin, with the sum of all weights equal to 1. In one example, the weights may assigned depending on which type of centrality measure a network operator or another person or entity may choose to emphasize. For instance, a higher influence level may be assigned to nodes that are critical to network flow by assigning weights as $w_D = 0.25$, $w_C = 0.25$, and $w_B = 0.50$, respectively. In one example, the overall influence measure may then be calculated, e.g., in accordance with Equation 4:

$$\text{Influence} = w_D * Bin_D + w_C * Bin_C + w_B * Bin_B \qquad \text{Equation 4:}$$

In Equation 4, $w_D$, $w_C$, and $w_B$ are weights corresponding to each measure of centrality and $Bin_D$, $Bin_C$, and $Bin_B$ are centrality bins to which each normalized centrality measure belongs. In the present example, the final influence category will range from 1 to 5 such that a score of 1 indicates low influence and a score of 5 indicates a very high level of influence.

In one example, when estimating the potential impact of a node that may be behaving suspiciously, the level of anomalousness of the node (e.g., the IP address) in question as well as presence of unusual behavior in any node with which the suspected node has communications may be considered. For example, nodes that exhibit anomalous behavior as well as communicate with other anomalous nodes might indicate a spreading threat, and in one example, may be ranked higher in an overall risk assessment. In one example, this is accomplished by adjusting the influence measure by an anomaly factor.

An assumption is made here that anomaly detection has been performed on the relevant network traffic data relating to other nodes, and an anomaly score indicating the statistical severity of an anomaly has been produced for one or more of the other nodes. In one example, the anomaly score is on a scale between 0 and 1. Scores not conforming to this scale can be transformed using a method such as Likelihood Inference for Statistical Anomalies (LISA). To calculate the anomaly factor, the present disclosure may identify the maximum anomaly score for a node within some pre-specified time interval (e.g. the last 24 hours, the last 12 hours, etc.). Separately, the present disclosure may identify the maximum anomaly score within the same time interval among any nodes with which a connection to the current node being evaluated has occurred. Using this approach, the anomaly factor (AF) may be defined in accordance with Equation 5:

$$AF = \frac{1}{2} * (\max(IP\_anomaly\_score) + \max(Connected\_IPs\_anomaly\_scores)) \quad \text{Equation 5:}$$

In the present example, the anomaly factor will be close to 1 for scenarios where anomalous behavior is severe for both the node/IP in question and connected nodes/IPs and close to 0 otherwise. With respect to the overall exposure calculation, the anomaly factor may either raise or lower the influence calculated in Equation 4.

There are many network events that either never make it to their destination or do not result in the transfer of a significant amount of content or data. Also, many common types of attacks such as port scans, SYN floods, and denial of service (DoS) attacks also do not result in the transmission of large volumes of data. These types of attacks may have methods of detection and remediation that are well-established and considered highly effective. In one example, to quantify the greater potential for damage due to theft of information or transmission of malicious payloads, the present disclosure may assign a higher risk to anomalous behaviors that are also accompanied by the transfer of information. In other words, content-bearing flows that appear to exhibit anomalous behavior may receive a higher risk score than non-content-bearing counterparts. In addition, even when there may be no explicit method to identify content-bearing flows, the present disclosure may still identify when a communication might be successful as well as when these successful exchanges include content beyond the data accounted for by the packet or other datagram header(s).

To illustrate, in one example, the present disclosure may omit from consideration connections involving private IP addresses. For instance, communication between or involving private IP addresses does not belong on the Internet. It can occur due to network misconfiguration or IP spoofing, but firewalls should be configured to reject such activity if it occurs. Thus, with safeguards in place, in one example, these communications may be removed from consideration.

For TCP traffic, the present disclosure may look for an ACK flag being set. For instance, TCP communications may be established through a 3-way handshake which includes the ACK. Before any significant content exchange can occur, the handshake must be completed. In addition, the present disclosure may look to see that the duration of the connection is greater than 0. Connections with large payloads occupy a longer duration of time. Thus, when content-bearing connections with a duration of 0 are seen, it may be assumed that those packets are unsuccessful in reaching their destination, e.g., possibly due to firewall actions or the like. Moreover, the present disclosure may inspect whether the packet size is greater than a pre-specified threshold in bytes. Depending on the network type and if options are included in the header, the header takes up a variable amount of space in the packet. However, for TCP connections, the header may contain 20-60 bytes. Thus, for TCP connections, packets with more than 60 bytes may be considered to include a payload.

Using the above information and criteria, in one example, the present disclosure defines three levels of content, with each level carrying a specified weight that will be used as a multiplier to adjust the exposure score, e.g., in accordance with Table 2:

TABLE 2

| Content level | Potential impact | Criteria | Weight |
|---|---|---|---|
| 1 | Limited | Connections involving private IP addresses, duration of connection = 0, no TCP ACK flag, packet size less than 60 bytes | .5 |
| 2 | Possible | Connections not involving private IP addresses, duration of connection > 0, TCP ACK flag present, 60 bytes < packet size < 80 bytes | 1 |
| 3 | Probable | Connections not involving private IP addresses, duration of connection > 0, TCP ACK flag present, packet size > 80 bytes | 1.5 |

The exposure measure may then be adjusted relative to the content level using the above content multipliers (CMs). Notably, the exposure of a potential threat is limited when an insignificant amount of data is transmitted during a connection or the flow appears to be unsuccessful in reaching the destination. Conversely, when a large amount of data is involved in anomalous activity, concern may be heightened. For events with content level 1, the impact of suspicious activity is limited. Level 2 indicates possible impact, and level 3 indicates a probable impact. The weight for each level is used as a multiplier to adjust the raw exposure score so that the score reflects the level of content that is exchanged between two nodes/IP addresses.

To summarize, there are three components which may be used to calculate exposure in accordance with the present disclosure: influence (e.g., a level ranging from 1 to 5), anomaly factor (AF) (e.g., a number ranging from 0 to 1), and content multiplier (CM) (e.g., a factor comprising one of 0.5, 1.0, or 1.5). In one example, an initial or raw exposure score may be calculated as the product of the above three components, e.g., in accordance with Equation 6:

$$RawExposure = Influence * AF * CM \qquad \text{Equation 6:}$$

In one example, a final exposure score may comprise a classification of the raw exposure score, e.g., from "low" to "very high." For example, a first bin may represent a "low" level of exposure and may represent a quantile from $0.0 \leq x < 1.0$. A second bin may represent a "moderate" level of exposure and may represent a quantile from $1.0 \leq x < 2.0$. A third bin may represent an "average" level of exposure and may represent a quantile from $2.0 \leq x < 3.0$. A fourth bin may represent a "high" level of exposure and may represent a quantile from $3.0 \leq x < 4.0$. Finally, a fifth bin may represent a "very high" level of exposure and may represent a quantile of $x \geq 4.0$.

As mentioned above, in addition to an exposure score, the present disclosure also calculates a persistence score. Persistence takes into account the extent to which abnormal behavior persists through time (recurrence) along with the existing reputation of the node under review (reputation). As referred to herein, recurrence may be defined as an instance of abnormal behavior that occurs across numerous time bins as opposed to only a single occurrence. As unusual behavior becomes more prolonged, the level of concern will increase. In an illustrative example, four recurrence levels may be used to categorize the extended presence of anomalous behavior: low (node shows abnormal behavior in current time bin only), moderate (abnormal behavior in current and previous time bin), average (abnormal behavior in current and 2 previous time bins), and high (abnormal behavior in more than 3 consecutive time bins).

In one example, the reputation measure may be identified through inspection of publicly available or private threat intelligence databases. If an IP address/node has a history of suspicious activity, it may be present in one or several of the available threat intelligence databases. A node/IP address present in any database is labeled as "reported." Otherwise, the node may be assigned the designation "clean." In one example, the two subcomponents are combined together to define four categories of persistence, e.g., as shown in Table 3 (e.g., a persistence matrix). For instance, nodes/IP addresses with high recurrence may fall in the most severe of the four categories of persistence.

TABLE 3

|            | Recurrence |          |         |      |
|------------|------------|----------|---------|------|
| Reputation | Low        | Moderate | Average | High |
| Clean      | 1          | 2        | 3       | 4    |
| Reported   | 2          | 3        | 3       | 4    |

Lastly, the outputs from the exposure and persistence components may be combined to identify a threat level, or risk score, e.g., in accordance with Table 4 (e.g., a threat matrix).

TABLE 4

|          | Persistence |          |         |      |
|----------|-------------|----------|---------|------|
| Exposure | Low         | Moderate | Average | High |
| Low      | 1           | 1        | 1       | 1    |
| Moderate | 1           | 2        | 2       | 2    |

TABLE 4-continued

|           | Persistence |          |         |      |
|-----------|-------------|----------|---------|------|
| Exposure  | Low         | Moderate | Average | High |
| Average   | 2           | 3        | 3       | 4    |
| High      | 3           | 4        | 4       | 5    |
| Very High | 3           | 4        | 5       | 5    |

In the example of Table 4 there are five classifications of risk (or "threat levels"): 1—informational, 2—low risk, 3—medium risk, 4—high risk, and 5—critical. For instance, a classification of 1 may imply that an anomaly is informational, whereas a score of 5 may indicate a critical situation in which the pertinent anomalous activity should be investigated or automatically addressed as soon as possible.

In one example, the present disclosure may also incorporate a damage potential aspect to the risk assessment. For example, a node may be classified by the type of services the node supports (e.g., a web server, a database, a mail server, etc.). In this way, it may be identified if users are likely to experience degradation of performance, such as system instability, versus damage in the form of privacy breaches in which there is unwanted access to confidential information. In addition, complex threats may still take a great deal of time to track down and either dismiss or eradicate. In one example, the present disclosure may track the ticket times for the investigation and remediation that occurs for security threats. Historical data containing the traffic patterns that are relevant to each threat may also be recorded. Machine learning may then be applied to predict ticket times for different threat patterns as they occur.

It should be noted that the foregoing describes just one example of the calculation of the threat level or risk score in accordance with the present disclosure. For instance, in other examples, more or less final threat levels/risk scores may be made available. Similarly, more or less persistence score categories may be utilized, more or less recurrence measure categories may be utilized, more or less exposure bins may be utilized, more or less centrality bins may be utilized and so forth. Alternatively, or in addition, the boundaries between different bins or other categories for the centrality metrics, the exposure bins, the recurrence measures, and so forth may be adjusted in various ways, such as using non-equal thresholds/ranges for each category, adjusting categories to be overall higher or lower with respect to a range of available measures, and so on. Thus, these and other modifications are all contemplated within the scope of the present disclosure.

Figure 3:
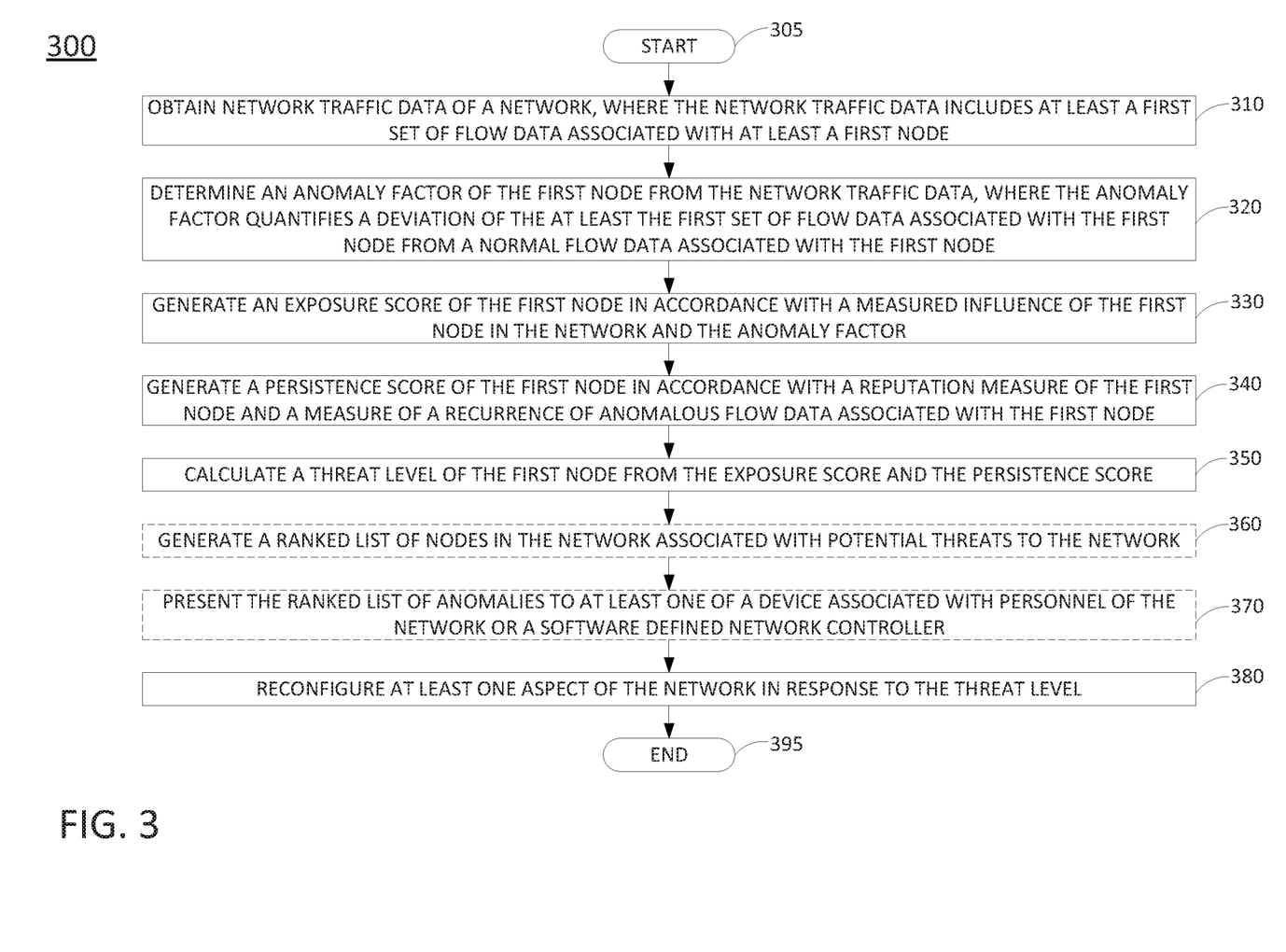
FIG. 3 illustrates a flowchart of an example method for reconfiguring at least one aspect of a network in response to a threat level of a node calculated from an exposure score and a persistence score.

FIG. 3 illustrates a flowchart of an example method 300 for reconfiguring at least one aspect of a network in response to a threat level of a node calculated from an exposure score and a persistence score, in accordance with the present disclosure. In one example, the method 300 is performed by a component of the system 100 of FIG. 1, such as by central analytics platform 150, and/or any one or more components thereof (e.g., a processor, or processors, performing operations stored in and loaded from a memory), or by central analytics platform 150, in conjunction with one or more other devices, such as SDN controller 155, and so forth. In one example, the steps, functions, or operations of method 300 may be performed by a computing device or system 400, and/or processor 402 as described in connection with FIG. 4 below. For instance, the computing device or system 400 may represent any one or more components of central analytics platform 150, SDN controller 155, etc. in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system obtains network traffic data of a network, where the network traffic data includes at least a first set of flow data associated with at least a first node of the network. In one example, the network traffic data includes measured properties and characteristic properties of a plurality of flows as described above. For instance, the characteristic properties may include at least one of: a source IP address, a destination IP address, a source port, a destination port, a protocol type, and so forth. On the other hand, the measured properties include at least one of: a packet size, a number of packets, a number of bytes, a duration of a connection, and so forth.

At step 320, the processing system determines an anomaly factor of the first node from the network traffic data (e.g., from the at least the first set of flow data). For example, the anomaly factor may quantify a deviation of the at least the first set of flow data associated with the first node from a normal flow data associated with the first node. The deviation could be specific to the node as compared to prior history of the node, or could be based upon a comparison to "normal" network traffic data for the type of node, for the type of node in a given zone of the network, and so forth. The first node may comprise, for example, a source of a flow associated with the at least the first set of flow data, or a destination of a flow associated with the at least the first set of flow data. For example, the first node may be identified in the at least the first set of flow data as at least one of a source IP address or a destination IP address (it should be noted that the flow may include bidirectional traffic so that in some headers the first node may be identified in the destination IP, but it may also be sending response packets with its own IP address as the source IP address).

At step 330, the processing system generates an exposure score of the first node in accordance with a measured influence of the first node in the network and the anomaly factor. In one example, the measured influence is derived from at least one of: a normalized degree centrality of the first node with respect to other nodes in the network, a normalized betweenness centrality of the first node with respect to the other nodes in the network, or a normalized closeness centrality of the first node with respect to the other nodes in the network. In one example, the measured influence is a weighted combination of these measures. For instance, the measured influence may be calculated in accordance with any of Equations 1-3 and Equation 4 above.

In one example, the anomaly factor (AF) is further based upon a maximum anomaly score among the other nodes having at least one communication with the first node in the time period. For instance, the anomaly factor may comprise an average of a maximum anomaly score for the first node and the maximum anomaly score among the other nodes having at least one communication with the node in the time period (e.g., in accordance with Equation 5 above).

In one example, the exposure score is further in accordance with a content multiplier (CM). For instance, the CM may comprise a weight for adjusting the exposure score base upon a quantity of content conveyed via the at least the first set of flow data (e.g., identified based upon one or more of a packet size, a presence of a TCP handshake (or TCP ACK flag), a duration of connection being greater than 0, the packet including non-header data, and so forth). In addition, in one example, the exposure score may be selected from among a plurality of discrete exposure bins. For instance, a raw exposure score may be assigned to a respective exposure bin (e.g., one of several quantiles which are indicative of different levels of exposure).

At step 340, the processing system generates a persistence score of the first node in accordance with a reputation measure of the first node and a measure of a recurrence of anomalous flow data associated with the first node. For instance, the measure of recurrence of the anomalous network flow data associated with the first node may comprise a number of successive time blocks over which the first node is detected to be associated with anomalous network flow data, and/or may be a score that is based upon a number of successive time blocks over which the first node is detected to be associated with anomalous network flow data, e.g., as described above. To illustrate, an "average" recurrence measure may correspond to abnormal behavior detected in a current and 2 previous time bins), while a "high" recurrence measure may correspond to abnormal behavior detected in more than 3 consecutive time bins, and so forth. In one example, the reputation measure comprises an indication of whether the first node is identified in a threat intelligence database (e.g., a binary factor of yes/no, clean/reported, etc., based upon one or more public or private threat intelligence sources). In addition, in one example, the persistence score may be generated in accordance with a second matrix having dimensions corresponding to possible values of the reputation measure and possible values of the measure of the recurrence, where entries in the second matrix include corresponding persistence scores. For instance, the persistence score may be calculated by cross-referencing the reputation measure and the recurrence measure according to Table 3 (e.g., a persistence matrix).

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At step 350, the processing system calculates a threat level of the first node from the exposure score and the persistence score. For example, the calculating the threat level associated with the first node from the exposure score and the persistence score may be in accordance with a first matrix having dimensions corresponding to possible values of the exposure score and possible values of the persistence score, where entries in the first matrix include corresponding threat levels. For instance, the threat level may be calculated by cross-referencing the exposure score and the persistence score according to Table 4 (e.g., a threat matrix). For example, the exposure score may be selected from among a plurality of discrete exposure bins at step 330, where each exposure bin corresponds to a row or column of the matrix.

At optional step 360, the processing system may generate a ranked list of nodes in the network associated with potential threats to the network, e.g., where the nodes are ranked in accordance with respective threat levels, and where the ranked list includes at least the first node and the threat level of the first node.

At optional step 370, the processing system may present the ranked list of anomalies to at least one of a device associated with personnel of the network or a SDN controller. For instance, network personnel may prioritize investigation of those anomalies that have the greatest potential for harming the network while a SDN controller may configure other nodes to avoid the node(s) comprising potential threats according to the list, may identify other network resources for potentially offloading network traffic of the first node, and so forth.

At step 380, the processing system reconfigures at least one aspect of the network in response to the threat level of the first node that is calculated. For instance, the processing system may include or comprise the SDN controller or the processing system may instruct an SDN controller to reconfigure the at least one aspect of the network. In one example, the reconfiguring the at least one aspect of the network in response to the threat level of the first node is performed when the first node is in a position above a cutoff in the ranked list (e.g., within the top 20 potential threats, the top 50 potential threats, etc.). Alternatively, or in addition, in one example, the reconfiguring of step 380 is performed when the threat level is above a threshold threat level. The reconfiguring the at least one aspect of the network in may include blocking network traffic of the first node, throttling the network traffic of the first node, removing payloads of packets of the network traffic of the first node, and so forth. Alternatively, or in addition, reconfiguring the at least one aspect of the network in may include instantiating at least a second node to replace the first node for a network service, redirecting traffic of the network service for the first node to the at least the second node, and so forth. Thus, the processing system may effectively remove the first node from the network or may filter outbound or inbound traffic to another device, e.g., a firewall, a sandbox, a malware detection system, or the like.

Following step 380, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-350, 310-380, and so forth. In another example, the method 300 may omit step 380. In still another example, the method 300 may generate the persistence score in the absence of collecting and processing a reputation measure. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for reconfiguring at least one aspect of a network in response to a threat level of a node calculated from an exposure score and a persistence score, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for reconfiguring at least one aspect of a network in response to a threat level of a node calculated from an exposure score and a persistence score (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for reconfiguring at least one aspect of a network in response to a threat level of a node calculated from an exposure score and a persistence score (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor deployed in a network, network traffic data of the network, wherein the network traffic data includes at least a first set of flow data associated with at least a first node;
determining, by the processing system, an anomaly factor of the first node from the network traffic data, wherein the anomaly factor quantifies a deviation of the at least the first set of flow data associated with the first node from a normal flow data associated with the first node;
generating, by the processing system, an exposure score of the first node in accordance with a measured influence of the first node in the network and the anomaly factor;
generating, by the processing system, a persistence score of the first node in accordance with a reputation measure of the first node and a measure of a recurrence of anomalous network flow data associated with the first node;
calculating, by the processing system, a threat level of the first node from the exposure score and the persistence score; and
reconfiguring, by the processing system, at least one aspect of the network in response to the threat level, wherein the reconfiguring alters a processing of network traffic associated with the first node in the network.

2. The method of claim 1, further comprising:
generating a ranked list of nodes in the network associated with potential threats to the network, wherein the nodes are ranked in accordance with respective threat levels, wherein the ranked list includes the first node and the threat level of the first node.

3. The method of claim 2, further comprising:
presenting the ranked list of nodes to at least one of: a device associated with personnel of the network or a software defined network controller.

4. The method of claim 2, wherein the reconfiguring the at least one aspect of the network in response to the threat level of the first node is performed when the first node is in a position above a cutoff in the ranked list of nodes.

5. The method of claim 1, wherein the exposure score is further in accordance with a content multiplier.

6. The method of claim 5, wherein the content multiplier comprises a weight for adjusting the exposure score based upon a quantity of content conveyed via the at least the first set of flow data.

7. The method of claim 1, wherein the network traffic data includes measured properties and characteristic properties of a plurality of flows.

8. The method of claim 7, wherein the characteristic properties include at least one of:
a source internet protocol address;
a destination internet protocol address;
a source port;
a destination port; or
a protocol type; and
wherein the measured properties include at least one of:
a packet size;
a number of packets;
a number of bytes; or
a duration of a connection.

9. The method of claim 1, wherein the first node comprises at least one of:
a source of a flow associated with the at least the first set of flow data; or
a destination of a flow associated with the at least the first set of flow data.

10. The method of claim 1, wherein the measured influence is derived from at least one of:
a normalized degree centrality of the first node with respect to other nodes in the network;
a normalized betweenness centrality of the first node with respect to the other nodes in the network; or
a normalized closeness centrality of the first node with respect to the other nodes in the network.

11. The method of claim 10, wherein the anomaly factor is further based upon a maximum anomaly score among the other nodes having at least one communication with the first node in a time period.

12. The method of claim 11, wherein the anomaly factor comprises an average of a maximum anomaly score for the first node and the maximum anomaly score among the other nodes having at least one communication with the node in the time period.

13. The method of claim 1, wherein the measure of the recurrence of the anomalous network flow data associated with the first node is based upon a number of successive time blocks over which the first node is detected to be associated with anomalous network flow data.

14. The method of claim 1, wherein the reputation measure comprises an indication of whether the first node is identified in a threat intelligence database.

15. The method of claim 1, wherein the calculating the threat level associated with the first node from the exposure score and the persistence score is in accordance with a first matrix having dimensions corresponding to possible values of the exposure score and possible values of the persistence score, wherein entries in the first matrix include corresponding threat levels.

16. The method of claim 1, wherein the persistence score is generated in accordance with a second matrix having dimensions corresponding to possible values of the reputation measure and possible values of the measure of the recurrence, wherein entries in the second matrix include corresponding persistence scores.

17. The method of claim 1, wherein the altering the processing of network traffic associated with the first node in the network comprises at least one of:
  blocking the network traffic to the first node;
  throttling the network traffic that is sent to the first node; or
  removing payloads of packets of the network traffic that is sent to the first node.

18. The method of claim 1, wherein the network traffic associated with the first node is further associated with a network service, wherein the altering the processing of network traffic comprises at least one of:
  instantiating at least a second node to replace the first node for the network service, wherein the network traffic is directed to the second node; or
  redirecting the network traffic for the first node to the at least the second node for the network service.

19. A non-transitory computer-readable medium storing instructions which, when executed by a processing system including at least one processor when deployed in a network, cause the processing system to perform operations, the operations comprising:
  obtaining network traffic data of the network, wherein the network traffic data includes at least a first set of flow data associated with at least a first node;
  determining an anomaly factor of the first node from the network traffic data, wherein the anomaly factor quantifies a deviation of the at least the first set of flow data associated with the first node from a normal flow data associated with the first node;
  generating an exposure score of the first node in accordance with a measured influence of the first node in the network and the anomaly factor;
  generating a persistence score of the first node in accordance with a reputation measure of the first node and a measure of a recurrence of anomalous network flow data associated with the first node;
  calculating a threat level of the first node from the exposure score and the persistence score; and
  reconfiguring at least one aspect of the network in response to the threat level, wherein the reconfiguring comprises altering a processing of network traffic associated with the first node in the network.

20. A device comprising:
a processing system including at least one processor; and
a computer-readable medium storing instructions which, when executed by the processing system when deployed in a network, cause the processing system to perform operations, the operations comprising:
  obtaining network traffic data of the network, wherein the network traffic data includes at least a first set of flow data associated with at least a first node;
  determining an anomaly factor of the first node from the network traffic data, wherein the anomaly factor quantifies a deviation of the at least the first set of flow data associated with the first node from a normal flow data associated with the first node;
  generating an exposure score of the first node in accordance with a measured influence of the first node in the network and the anomaly factor;
  generating a persistence score of the first node in accordance with a reputation measure of the first node and a measure of a recurrence of anomalous network flow data associated with the first node;
  calculating a threat level of the first node from the exposure score and the persistence score; and
  reconfiguring at least one aspect of the network in response to the threat level, wherein the reconfiguring alters a processing of network traffic associated with the first node in the network.

* * * * *